(No Model.)
R. M. LAREMORE.
BUTCHERING DEVICE.
No. 311,191. Patented Jan. 27, 1885.
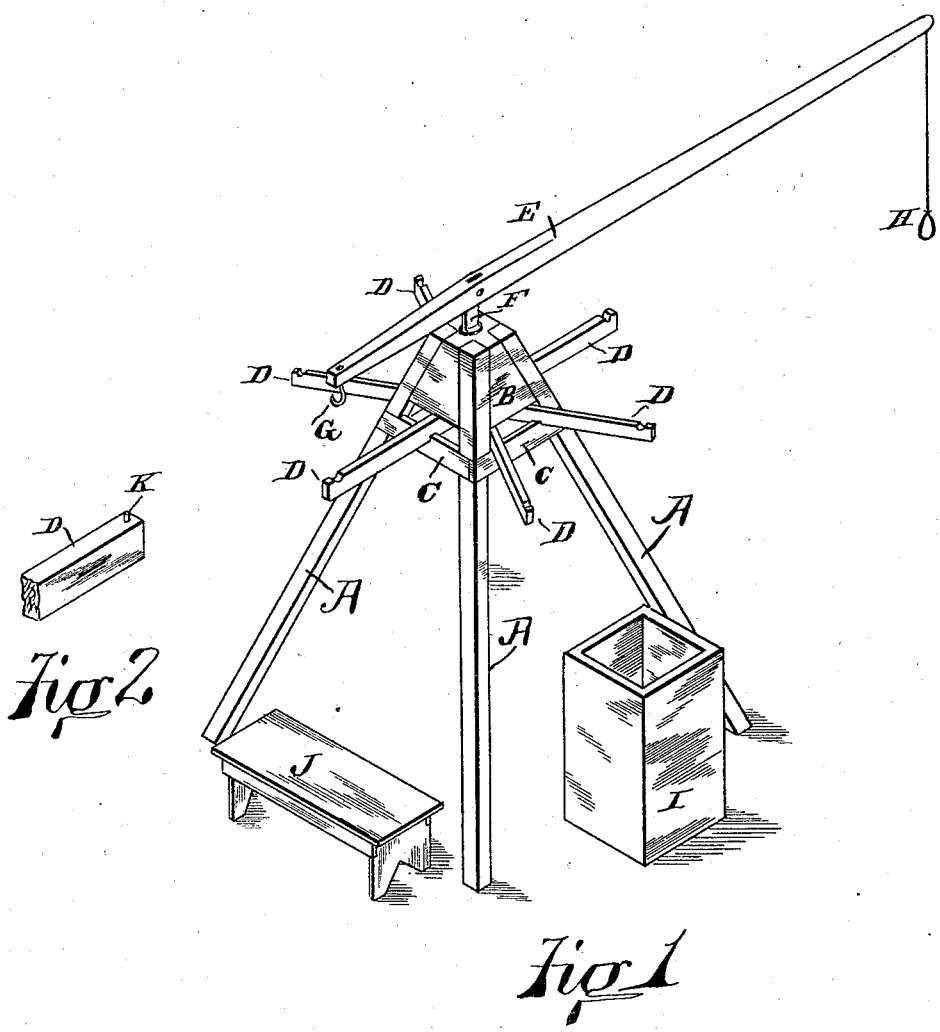
Witnesses:
W. A. Seward
Jno Lorenz
Robert M. Laremore, Inventor
by James W. See
Attorney

UNITED STATES PATENT OFFICE.

ROBERT M. LAREMORE, OF NEAR PEORIA, INDIANA.

BUTCHERING DEVICE.

SPECIFICATION forming part of Letters Patent No. 311,191, dated January 27, 1885.

Application filed February 4, 1884. (No model.)

*To all whom it may concern:*

Be it known that I, ROBERT M. LAREMORE, residing near Peoria, Franklin county, Indiana, have invented certain new and useful Improvements in Butchering-Frames, of which the following is a specification.

This invention pertains to a frame for supporting and aiding in handling carcasses during the operation of butchering.

The invention will be fully understood from the following description, taken in connection with the accompanying drawings, in which—

Figure 1 is a perspective view of a butchering-frame embodying my improvements; and Fig. 2, a perspective view, enlarged, of the inner end of one of the arms.

In the drawings, A represents four frame pieces or legs, pyramidally arranged; B, a top piece, to which the upper ends of the legs are secured; C, fulcrum-pieces secured to the legs a short distance below the bottom of the top piece, B, and encircling the structure; D, a series of radially-arranged arms projecting outward from the structure, and supported at their inner ends by engagement over the fulcrum-pieces and under the top piece; E, a sweep-lever pivoted at the top of the frame structure; F, a pivot fitted to swivel in the top of the top piece upon a vertical axis, and to which the lever E is secured by a horizontal-arranged pivot; G, a hook in the short end of the lever; H, a lanyard attached to the long end of the lever; I, a scalding-tank; J, a cleaning-bench; and K, a dowel projecting from the upper surface of the inner end of each of the arms D, to engage in suitable dowel-holes in the under side of the top pieces. The arms D have notches at their outer ends to receive gambrels. The arms are not permanently placed, being supported merely by their engagement with the fulcrum-pieces and the top piece. They may be shifted angularly and their number may be increased or diminished, and they may be removed for compact storage. The lever E is adapted to lift things secured to the hook G, and also to turn around the axis of the structure, and carry its load in a circular path around the structure. The arms D should come at such height as to properly support a gambreled carcass, and the lanyard H permits the lever to be handled when its long end is greatly elevated. The scalding-tank I and the cleaning-bench J should be brought within proper sweep of the short end of the lever.

In the operation of this device the animal is killed and stuck and gambreled and hooked upon the short end of the lever, which is depressed as far as possible for the purpose. The long end of the lever is then pulled down and moved, sweep-like, until the carcass is brought over the scalding-tank, where the carcass is immersed in the tank by obvious manipulation of the lever, after which the carcass is swept around to the cleaning-bench, where the hair is removed, after which the carcass is again taken by the lever and swept around to one of the arms, where it is hung by the gambrel and left. As many carcasses may be thus treated as there are supporting-arms in the structure, and upon the completion of the dressing, which is done while the carcass is hung upon the arms, they may be brought one by one to the cleaning-bench by means of the lever, which may now be used for a cutting-bench.

Butchering-frames have been heretofore constructed with a central vertical pillar supporting radial arms and a swinging lever; therefore I do not claim any of said elements as of my invention.

I claim as my invention—

The combination, substantially as set forth, of the pyramidally-arranged legs A, the top piece, B, the fulcrum-pieces C, secured to the legs upon a level below the bottom of the top piece, arms D, fitted to engage over said fulcrum-pieces and under said top piece, and the sweep-lever E, pivoted to swivel in the top piece.

ROBERT M. LAREMORE.

Witnesses:
MARION SMITH,
W. A. SEWARD.